United States Patent [19]

Karas

[11] Patent Number: 4,588,988

[45] Date of Patent: May 13, 1986

[54] INTRUSION BARRIER AND DETECTION APPARATUS

[75] Inventor: Nicholas V. Karas, Lowell, Mass.

[73] Assignee: The United States of America as represented by the Secretary of the Air Force, Washington, D.C.

[21] Appl. No.: 617,667

[22] Filed: Jun. 6, 1984

[51] Int. Cl.⁴ ........................ G08B 13/18; G01S 13/00

[52] U.S. Cl. .................................. 340/552; 343/5 PD

[58] Field of Search ........................ 340/552, 564, 541; 256/32, 8; 343/5 PD

[56] References Cited

U.S. PATENT DOCUMENTS

| | | | |
|---|---|---|---|
| 3,463,455 | 8/1969 | Meckel | 256/8 |
| 3,560,970 | 2/1971 | Kamimura et al. | 343/5 PD |
| 3,707,709 | 12/1972 | Wolf et al. | 340/552 |
| 4,091,367 | 5/1978 | Harman | 340/552 |
| 4,135,185 | 1/1979 | Rotman et al. | 340/552 |
| 4,213,122 | 7/1980 | Rotman et al. | 340/552 |
| 4,318,102 | 3/1982 | Poirier | 340/552 X |
| 4,327,358 | 4/1982 | Karas | 340/541 |
| 4,503,423 | 3/1985 | Mainiero et al. | 340/552 |
| 4,525,701 | 6/1985 | Leih | 256/32 X |

FOREIGN PATENT DOCUMENTS

| | | | |
|---|---|---|---|
| 731916 | 4/1966 | Canada | 256/32 |
| 938853 | 7/1982 | U.S.S.R. | 256/32 |

*Primary Examiner*—Glen R. Swann, III
*Assistant Examiner*—Thomas J. Mullen, Jr.
*Attorney, Agent, or Firm*—Donald J. Singer; Richard J. Donahue

[57] ABSTRACT

A ported coaxial cable is positioned atop or wound around a coil of barbed wire and is coextensive therewith. Radio frequency energy applied to the cable is randomly dispersed about the exterior of the coil. Variations in the reflected energy caused by intrusion of the area adjacent the coil, including the areas above or beneath the coil, are processed by detection system signal processing equipment to determine the incidence and location of intrusion events.

5 Claims, 5 Drawing Figures

INTRUSION BARRIER AND DETECTION APPARATUS

STATEMENT OF GOVERNMENT INTEREST

The invention described herein may be manufactured and used by or for the Government for governmental purposes without the payment of any royalty thereon.

BACKGROUND OF THE INVENTION

This invention relates to systems for the protection of secure areas, and to intruder detection systems. Specifically, it relates to an intruder detection system that can be integrated with a physical barrier and that is adapted to detect any physical deformation of the barrier or transgression of the area adjacent the barrier.

It is often necessary to protect equipment and secure areas from unauthorized, unwanted and sometimes hostile personnel and vehicles. Such protection conventionally includes fencing that encompasses the area or equipment to be protected. Intruder detection systems are also used in conjunction with fences or other physical deterrent barriers to enable responsible personnel to monitor the premises and to take appropriate action in response to detected intrusions.

In U.S. Pat. No. 4,327,358, issued Apr. 27, 1982 to the present inventor, there is disclosed an integrated physical deterrent barrier and intruder detection sensor that provides surveillance of intrusions in the airspace over the barrier. The sensor is coextensive with and mounted on the top of the barrier and is integrated into a barbed wire-topped chain link fence by arranging appropriately spaced parallel strands of barbed wire into a V configuration so as to form a corner reflector antenna at the system operating frequency. The active element of the corner reflecter is a leaky transmission line that extends the length of the corner reflector antenna, radiates RF energy and carries reflections from intrusion events back to a receiver and processing circuits. While the aforementioned device has proven to be effective, it has been found to be susceptible to false alarms caused by birds and other non-target intrusions far above the physical barrier.

In U.S. patent application Ser. No. 486,478 filed Apr. 19, 1983 by the present inventor, there is disclosed a secure area protection system in which a physical deterrent barrier, such as a coil of barbed wire, has a ported coaxial cable coextensive with and mounted within the barbed wire coil. The ported coaxial cable illuminates the tubular volume within the barbed wire coil with RF energy from the intrusion detection system transmitter. Variations in radio frequency reflections caused by physical deformations of the barbed wire coil are processed by detection system signal processing equipment to determine the incidence and location of intrusion events. The sensor may be integrated into a barbed wire coil positioned atop a chain link fence and supported by parallel strands of barbed wire inserted into notches formed in V-shaped supports atop the fence.

Since the radio frequency field is substantially confined within the tubular volume of the barbed wire coil, it is necessary that the coil be physically deformed in order to activate the intrusion sensor. While the aforementioned device have proven to be effective, it may be possible in certain instances for an intruder to gain access to the protected area by either bridging over the barbed coil or tunnelling under it. Furthermore, considerable time and effort may be expended to thread the ported coaxial cable within the barbed wire coil and, in one embodiment, to coaxially suspend the ported coaxial cable therein.

SUMMARY OF THE INVENTION

In accordance with the present invention, there is provided an intrusion barrier and sensor in which a ported coaxial cable is positioned atop a barbed wire coil such that an electromagnetic field is randomly distributed abóut the outer surface of the coil. Energy that leaks out of the ported coaxial cable will be directed around the wire coil because the coil acts as a metallic ground plane due to the small spacing between individual turns of the coil. The ported coaxial cable may be helically wound about the barbed wire coil to further distribute the field and assure that the barrier cannot be violated by tunnelling under it. In an alternative embodiment of the invention, two contiguous barbed wire coils are provided having two ported coaxial cables, one positioned at the top, and the other at the bottom of the juncture thereof.

It is therefore the principle object of the present invention to provide an improved secure area protection system.

It is another object of the present invention to provide a sensor for a ported or leaky transmission line type intruder detection system that is integrated with a physical deterrent barrier in such a manner that it monitors not only a physical disturbance of the barrier but any attempted transgression of the area in the immediate vicinity of the barrier, including tunnelling in the area beneath the barrier.

These together with other objects, features and advantages of the invention will become more readily apparent from the following detailed description when taken in conjunction with the illustrative emodiments in the accompanying drawings wherein like elements are given like reference numerals throughout.

DETAILED DESCRIPTION OF THE PREFERRED EMBODIMENT

Figure 1:
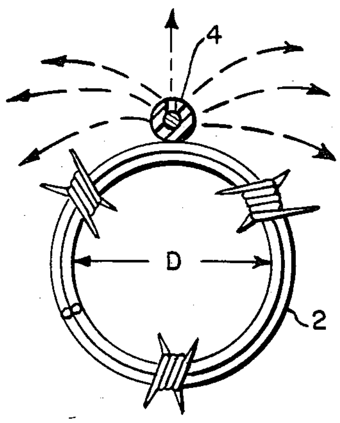
FIG. 1 is an end view illustration of a physical deterrent barrier comprising a ported coaxial cable positioned atop a single a helical barbed wire coil as comprehended by a preferred embodiment of the invention.

Referring now to FIG. 1 of the drawings, there is shown the end view of a barbed wire coil 2. The term "barbed wire" is intended to include wire having any form of sharp projections thereon which act as a physical deterrent. The diameter D of the coil 2 in FIGS. 1 and 2 has been greatly reduced with respect to the diameter of the wire and the barbs thereon for purposes of clarity of the drawings.

A ported coaxial cable 4 is disposed on the top of the coil 2 and extends along the length thereof. As will be described below, signal processing circuits are coupled to the ported coaxial cable 2 whereby it functions as an intrusion detection device.

Electromagnetic theory states and practice shows that if the spacing between the individual turns of coil 2 is about a tenth of a wavelength or less, they will reflect any RF energy that strikes them. In effect, the coil acts like a solid metal tube to electromagnetic energy and functions as a ground plane to direct the energy around the exterior of the coil. In a practical embodiment of the present invention the coil 2 may have a turn spacing as close as 4 inches and RF frequencies as high as 300 megaHertz before the RF energy will penetrate the barbed wire coil. Many times, in practice, the interturn spacing is a fraction of an inch which, of course, allows higher RF frequencies to be used.

Figure 2:
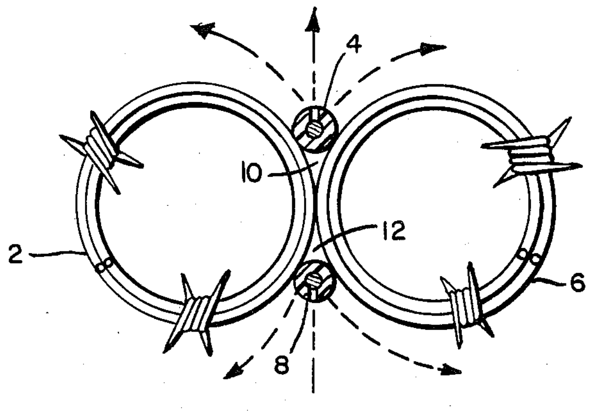
FIG. 2 is an end view illustration of the positioning of a pair of ported coaxial cables between a pair of barbed wire coils, as provided in another embodiment of the invention.

An alternate configuration of the present invention, shown in FIG. 2 utilizes two wire coils 2 and 6, positioned side by side. A pair of ported coaxial cables 4 and 8 are positioned at the top and bottom grooves or troughs 10 and 12 respectively which are formed at the juncture of the coils 2 and 6, whose individual coil turns may be slightly interleaved. In this arrangement a more intense field is formed in the ground immediately below the coils 2 and 6.

Figure 3:
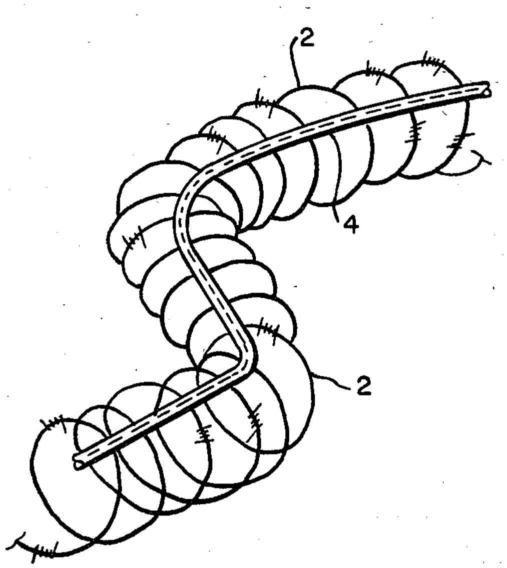
FIG. 3 is a pictorial representation of a serpentine arrangement of the coil of the present invention.
Figure 4:
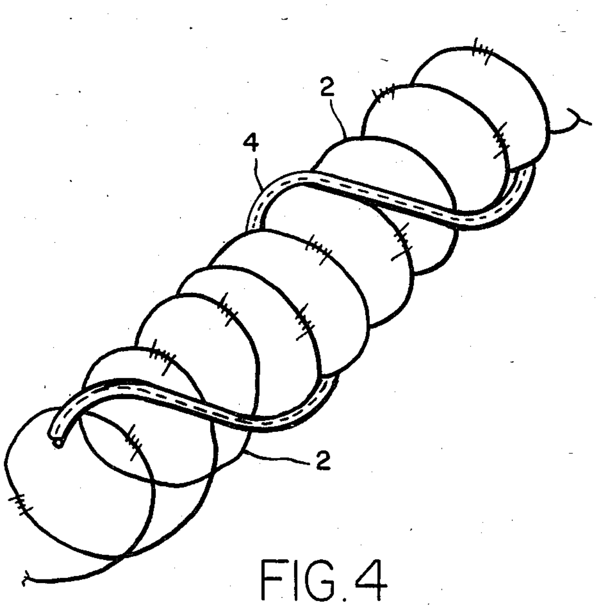
FIG. 4 is a pictorial representation of a helical arrangement of the ported coaxial cable about the coil in the present invention.

It will be apparent from FIG. 3 that the coil 2 may be laid out in a zig-zag, serpenture or other non-linear configuration to enclose and protect an area of any shape. In the embodiment depicted in FIG. 4, the ported coaxial cable 4 is spirally wound about the coil 2 to provide randomly distributed circumferential coverage.

Figure 5:
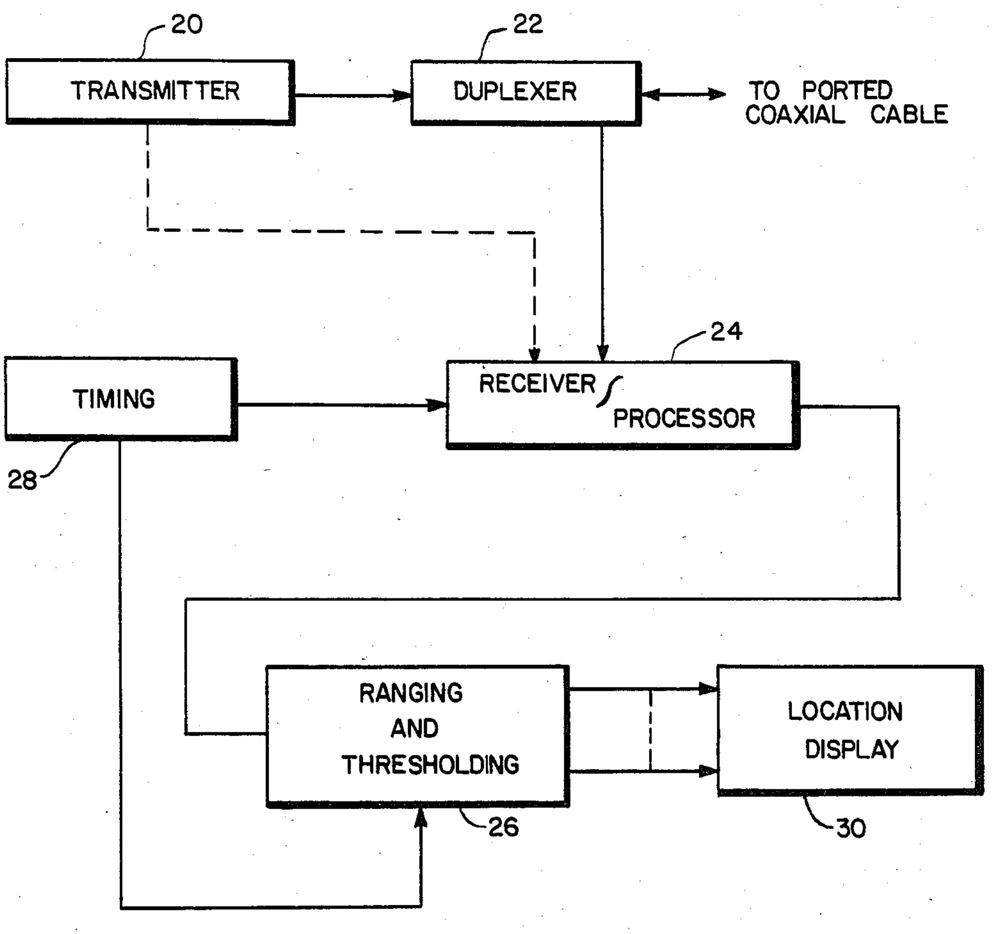
FIG. 5 PRIOR ART
FIG. 5 is a block diagram of the signal transmitting, receiving and processing circuits for the type of intrusion and detection system to which the invention pertains.

FIG. 5 is a block diagram of the electronic hardware and signal processing circuitry associated with the invention. This comprises a transmitter 20, a duplexer 22, receiver/processor 24, ranging and thresholding circuits 26, timing circuit 28 and location display 30, all of which are conventional in design and commonly used in conjunction with leaky transmission line radar ranging type intruder detection systems.

Instead of transmitting and receiving on the same ported coaxial cable, two cables could be utilized, one for transmitting the RF energy and the other for receiving reflection produced by disturbances of the electromagnetic field by an intruder. Either continuous wave (CW) or pulsed radio frequency signals can be transmitted. Pulses would allow for ranging in addition to detection.

While the invention has been described in terms of its preferred embodiments it is understood that the words which have been used are words of description rather than words of limitation and the changes within the purview of the appended claims may be made without departing from the scope and spirit of the invention in its broader aspects.

What is claimed is:

1. An intrusion barrier and detector comprising:
   - a coil of wire;
   - a ported coaxial cable disposed on the external surface of said coil of wire and extending along the length thereof;
   - and a radio frequency signal transceiver system coupled to said ported coaxial cable;
   - said radio freuency transceiver system being adapted to transmit radio frequency energy to said ported coaxial cable and to receive radio frequency signals from said ported coaxial cable indicative of intruder detection;
   - said coil of wire having an interturn spacing not exceeding $0.1\lambda$, where $\lambda$ is the wavelength of said radio frequency energy;
   - said coil of wire providing a tubular-shaped metallic grounding surface which alters the electromagnetic field of said radio frequency energy radiated by said ported coaxial cable to direct and concentrate said energy about said coil of wire.

2. Apparatus as defined in claim 1 wherein said ported coaxial cable is spirally wound about said coil of wire.

3. Apparatus as defined in claim 2 wherein the mean diameter of said coil of wire is within the range of thirty to forty inches.

4. Apparatus as defined in claim 3 wherein the spacing between turns of said coil of wire does not exceed four inches and the frequency of said radio frequency tranceiver system does not exceed 295 megaHertz.

5. An intrusion barrier and detector comprising:
   - first and second coils of wire positioned side by side whereby the turns of said first and second coils are slightly interleaved to form first and second grooves therebetween;
   - first and second ported coaxial cables disposed in said first and second grooves respectively; and
   - a radio frequency signal transceiver system coupled to said first and second ported coaxial cables, said radio frequency transceiver system being adapted to transmit radio frequency energy to said first and second ported coaxial cables and to receive radio frequency signals therefrom indicative of intruder detection.

* * * * *